(12) United States Patent
Sheoran et al.

(10) Patent No.: US 8,328,508 B2
(45) Date of Patent: Dec. 11, 2012

(54) COOLING SYSTEMS AND ASSEMBLIES FOR COOLING AN AFT BEARING ASSEMBLY MOUNTED TO A ROTOR

(75) Inventors: Yogendra Yogi Sheoran, Scottsdale, AZ (US); Bruce Dan Bouldin, Phoenix, AZ (US); Vunnam Kiran, Andhra Pradesh (IN); John Pfligler, Phoenix, AZ (US); Lori Wheeler, Scottsdale, AZ (US); Lance Callen, Phoenix, AZ (US); Reha Gomuc, Phoenix, AZ (US)

(73) Assignee: Honeywell International Inc., Morristown, NJ (US)

( * ) Notice: Subject to any disclaimer, the term of this patent is extended or adjusted under 35 U.S.C. 154(b) by 704 days.

(21) Appl. No.: 12/564,538

(22) Filed: Sep. 22, 2009

(65) Prior Publication Data
US 2011/0070076 A1    Mar. 24, 2011

(51) Int. Cl.
*F01D 25/12* (2006.01)
(52) U.S. Cl. .................................. 415/180; 415/229
(58) Field of Classification Search ................ 415/142, 415/180, 229
See application file for complete search history.

(56) References Cited

U.S. PATENT DOCUMENTS

| | | | |
|---|---|---|---|
| 2,759,700 A | * | 8/1956 | Wheatley ...................... 415/180 |
| 5,727,378 A | | 3/1998 | Seymour |
| 7,493,769 B2 | | 2/2009 | Jangili |

* cited by examiner

*Primary Examiner* — Richard Edgar
(74) *Attorney, Agent, or Firm* — Ingrassia Fisher & Lorenz, P.C.

(57) ABSTRACT

Assemblies for cooling an aft bearing assembly mounted to a rotor are provided. An assembly includes a static aft bearing structure configured to surround the aft bearing assembly and including a cylindrical section defining a cavity for disposal of the aft bearing assembly, a plurality of hollow struts extending from the static aft bearing structure, each hollow strut including an outer radial end configured to receive a gas from an air source and to provide a pathway for the gas to flow into the cavity, and a center-body cap disposed over an end of the static aft bearing structure, the center-body cap including a rim configured to create a low pressure region at an interface between the static aft bearing structure and the center-body cap, wherein the low pressure region has a pressure that is lower than a pressure within the cavity.

19 Claims, 5 Drawing Sheets

COOLING SYSTEMS AND ASSEMBLIES FOR COOLING AN AFT BEARING ASSEMBLY MOUNTED TO A ROTOR

TECHNICAL FIELD

The inventive subject matter generally relates to cooling systems, and more particularly relates to cooling systems for use with bearing assemblies.

BACKGROUND

A turbofan gas turbine engine may be used to power aircraft and may include, for example, a fan section, a compressor section, a combustor section, a turbine section, and an exhaust section, where each section has components that are mounted to a rotor. The fan section induces air from the surrounding environment into the engine and accelerates a fraction of the air toward the compressor section. The remaining fraction of air is accelerated into and through a bypass plenum, and out the exhaust section.

The compressor section, which may include a high pressure compressor and a low pressure compressor, raises the pressure of the air it receives from the fan section to a relatively high level. The compressed air then enters the combustor section, where a ring of fuel nozzles injects a steady stream of fuel into a plenum. The injected fuel is ignited to produce high-energy compressed air. The air then flows into and through the turbine section causing turbine blades therein to rotate and generate energy. This energy is used to power the fan and compressor sections. The air exiting the turbine section is exhausted from the engine via the exhaust section, and the energy remaining in the exhaust air aids the thrust generated by the air flowing through the bypass plenum.

To support the rotor during engine operation, bearing assemblies may be mounted to a forward section of the rotor and/or an aft section of the rotor. The bearing assemblies are typically kept cool with a bearing lubrication system that lubricates components of the bearing assemblies. Many configurations include a tube that fluidly communicates with an oil source for continuous direction of a lubricant, such as oil, over the bearings. However, bearing assemblies mounted to the aft section of the rotor may be subjected to relatively high operating temperatures. These high temperatures may cause carbonization of the lubricants, also known as coke formation or "coking", which may exasperate heat generation and heat retention. Over time, deposited coke may undesirably decrease the useful life of a lubricated bearing system.

In the past, heat shielding mechanisms have been employed to reduce the incidence of coking. For example, mechanisms such as insulation blankets have been wrapped around a bearing carrier of the bearing assembly to protect the assembly components from the high temperatures. However, as engine operating temperatures have continued to increase above 535° C. (1000° F.) due to the desire for increased engine efficiency, the effectiveness of insulation blankets in hot sections of the engine, such as in the exhaust section, has decreased.

Accordingly, it is desirable to have a bearing assembly cooling system that provides improved protection from high temperatures over conventional heat shield mechanisms. In addition, it is desirable to have a bearing assembly cooling system that is relatively simple and inexpensive to implement and that imposes very little to no weight or power loss penalty on the engine. Moreover, it is desirable for the bearing assembly cooling system to be suitable for retrofit into existing engines. Furthermore, other desirable features and characteristics of the inventive subject matter will become apparent from the subsequent detailed description of the inventive subject matter and the appended claims, taken in conjunction with the accompanying drawings and this background of the inventive subject matter.

BRIEF SUMMARY

Cooling systems are provided.

In an embodiment, by way of example only, a cooling system includes a rotor, a bearing assembly mounted to the rotor, a static aft bearing structure surrounding the bearing assembly and including a cylindrical section defining a cavity within which the bearing assembly is disposed, an outer casing surrounding the static aft bearing structure and defining a portion of an exhaust pathway, a plurality of hollow struts extending from the static aft bearing structure towards the outer casing and through the exhaust pathway, each hollow strut including an outer radial end configured to receive a gas from an air source and to provide a pathway for the gas to flow into the cavity, and a center-body cap disposed over an end of the static aft bearing structure, the center-body cap including a rim configured to create a low pressure region at an interface between the static aft bearing structure and the center-body cap, wherein the low pressure region has a pressure that is lower than a pressure within the cavity.

In any embodiment, by way of example only, an assembly for cooling an aft bearing assembly mounted to a rotor is provided. The assembly includes a static aft bearing structure configured to surround the aft bearing assembly and including a cylindrical section defining a cavity for disposal of the aft bearing assembly, a plurality of hollow struts extending from the static aft bearing structure, each hollow strut including an outer radial end configured to receive a gas from an air source and to provide a pathway for the gas to flow into the cavity, and a center-body cap disposed over an end of the static aft bearing structure, the center-body cap including a rim configured to create a low pressure region at an interface between the static aft bearing structure and the center-body cap, wherein the low pressure region has a pressure that is lower than a pressure within the cavity.

BRIEF DESCRIPTION OF THE DRAWINGS

The inventive subject matter will hereinafter be described in conjunction with the following drawing figures, wherein like numerals denote like elements.

DETAILED DESCRIPTION

The following detailed description is merely exemplary in nature and is not intended to limit the inventive subject matter or the application and uses of the inventive subject matter.

Furthermore, there is no intention to be bound by any theory presented in the preceding background or the following detailed description.

Figure 1:
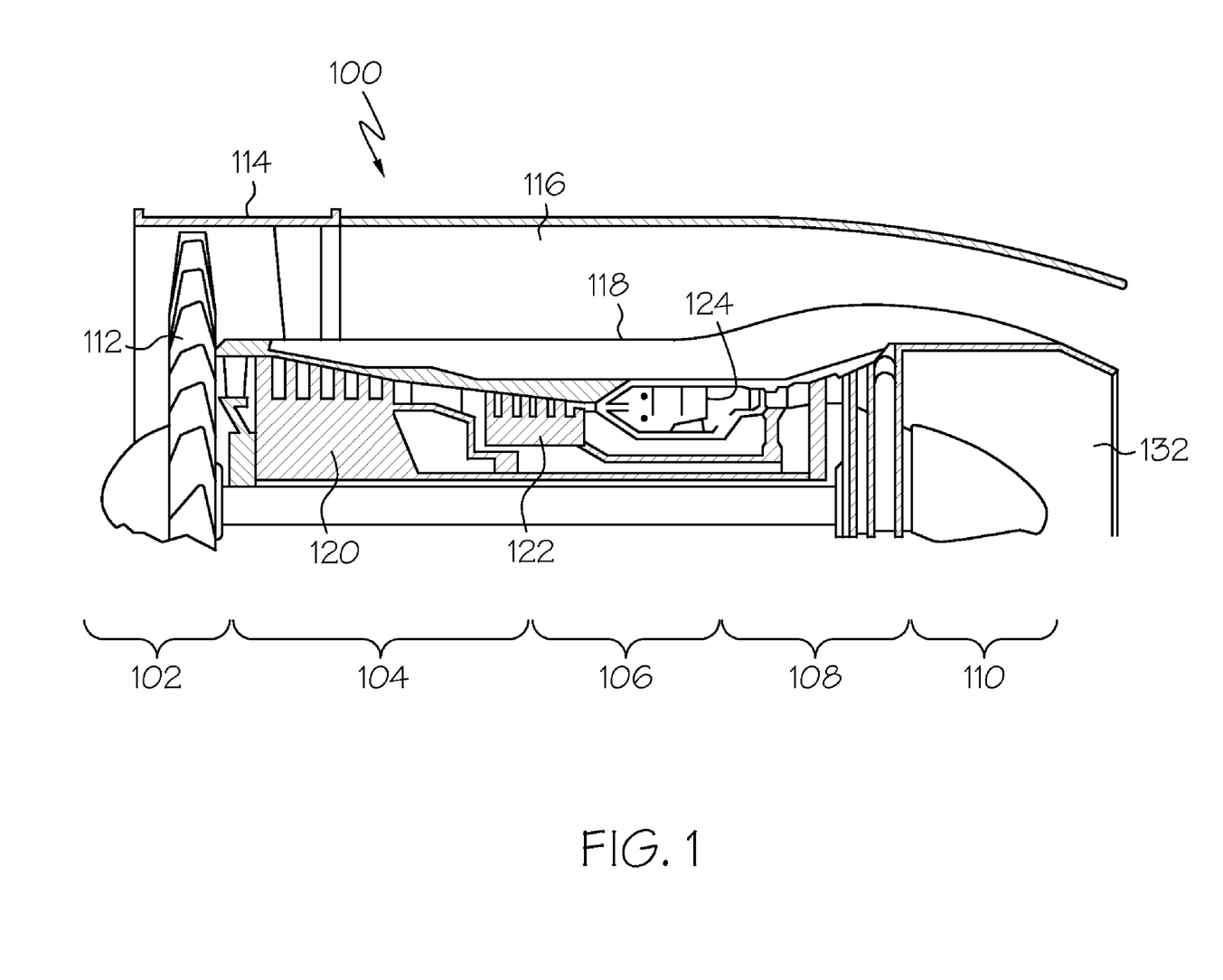
FIG. 1 is a simplified, schematic of a gas turbine engine, according to an embodiment.

FIG. 1 is a simplified, schematic of a gas turbine engine 100, according to an embodiment. The gas turbine engine 100 generally includes an intake section 102, a compressor section 104, a combustion section 106, a turbine section 108, and an exhaust section 110. The intake section 102 includes a fan 112, which is mounted in a fan case 114. The fan 112 draws air into the intake section 102 and accelerates it. A fraction of the accelerated air exhausted from the fan 112 is directed through a bypass section 116 disposed between the fan case 114 and an engine bypass duct 118, and provides a forward thrust. The remaining fraction of air exhausted from the fan 112 is directed into the compressor section 104.

The compressor section 104 includes an intermediate pressure compressor 120 and a high pressure compressor 122. The intermediate pressure compressor 120 raises the pressure of the air directed into it from the fan 112, and directs the compressed air into the high pressure compressor 122. The high pressure compressor 122 compresses the air still further, and directs the high pressure air into the combustion section 106. In the combustion section 106, which includes a combustor 124, the high pressure air is mixed with fuel and combusted. The combusted air is then directed into the turbine section 108.

Figure 2:
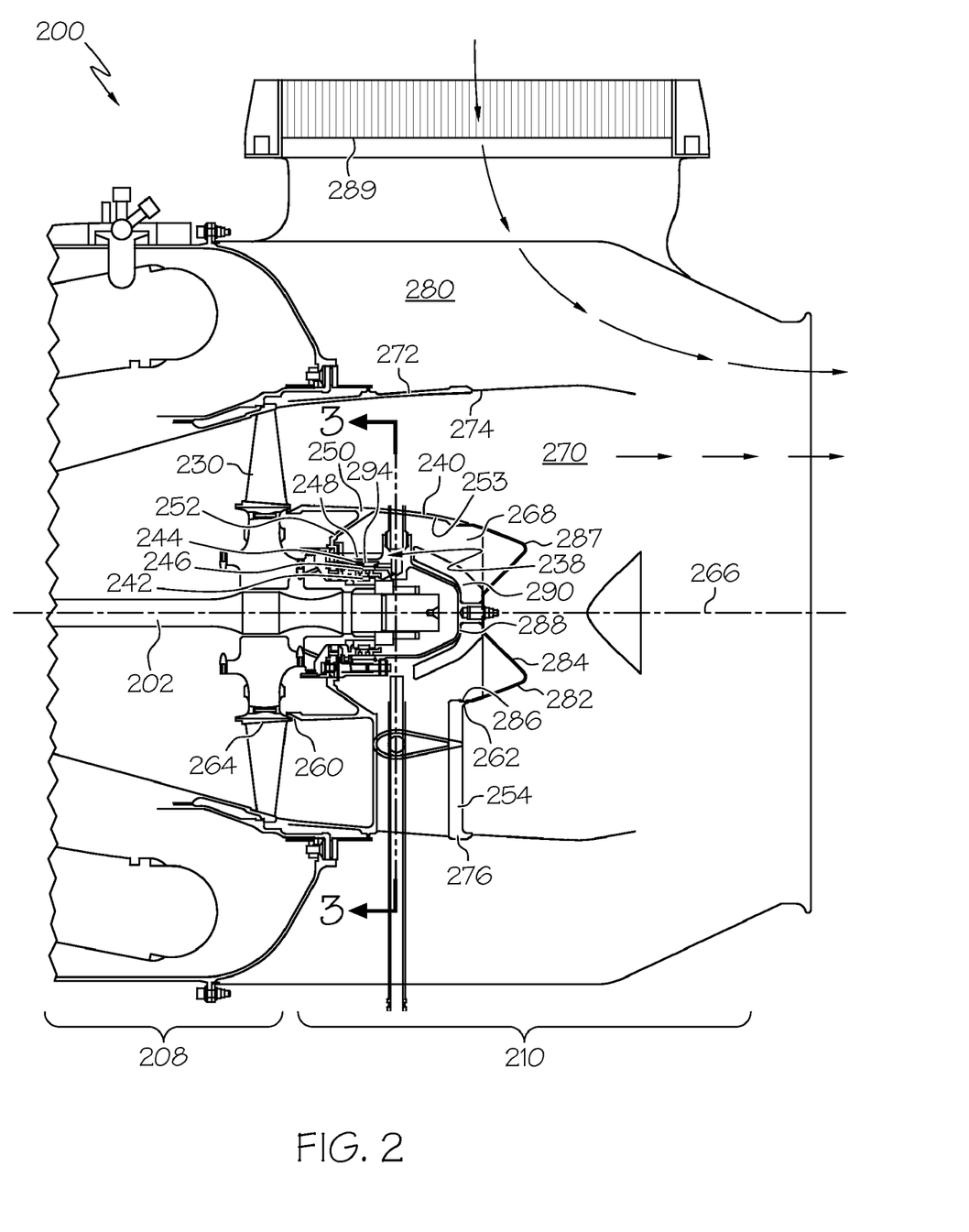
FIG. 2 is a cross-sectional side view of a turbine section and an exhaust section of an engine, according to an embodiment.

FIG. 2 is a cross-sectional side view of a turbine section 208 and an exhaust section 210 of an engine 200, according to an embodiment. The turbine section 208 and exhaust section 210 may be implemented into or used in conjunction with the engine 100 of FIG. 1, in an embodiment. The turbine section 208 includes a turbine 230, and the combusted air from the combustion section 106 (FIG. 1) expands through the turbine causing it to rotate. The turbine 230 rotates to drive equipment in the engine 100 (FIG. 1) via a shaft or spool 202.

The rotor 202 extends into the exhaust section 210 and is supported by a bearing assembly 238. The bearing assembly 238 is surrounded by a static aft bearing structure 240 and includes an inner race 242, an outer race 244, and one or more rolling elements 246. In an embodiment, the inner race 242 is mounted to the rotor 202, and the outer race 244 is mounted a static structure 248. One or more rolling elements 246 are disposed between the inner and outer races 242, 244. In an embodiment, the rolling elements 246 may include rollers, bearings or other components capable of rolling.

As alluded to above, the static aft bearing structure 240 is configured to provide structure for positioning the bearing assembly 238 around the rotor 202. Additionally, the static aft bearing structure 240 may be further configured to provide air to the bearing assembly 238 for cooling. In this regard, the static aft bearing structure 240 may include a cylindrical section 250, a mounting flange 252, and a plurality of hollow struts 254 (only one of which is shown), according to an embodiment.

In an embodiment, the cylindrical section 250 has a forward end 260 and an aft end 262. According to an embodiment, the forward end 260 is disposed adjacent to a hub 264 of the low pressure turbine 230. In an embodiment, the forward end 260 is spaced apart from the hub 264 to form a gap. The gap may be relatively small to compensate for axial expansion of the components of the turbine section 208 during engine operation. For example, the gap may have an axial width in a range of about 1.0 mm to about 1.5 mm. In other embodiments, the gap may be wider or narrower. To provide a substantially smooth surface over which the combusted air may flow between the turbine section 208 and the exhaust section 210, the forward end 260 may have an outer diameter that is slightly less (e.g., in a range of about 10 cm to about 15 cm less) than an inner diameter of the low pressure turbine hub 264, in an embodiment. In other embodiments, the outer diameter of the forward end 260 may be substantially equal to or greater than the inner diameter of the low pressure turbine hub 264.

To reduce exit pressure loss, the cylindrical section 250 may have a curved outer surface. For example, in an embodiment, the forward end 260 may have an outer diameter that is greater than an outer diameter of the aft end 262. In an embodiment, the outer diameter of the forward end 260 may be gradually reduced at an angle of about 7 degrees relative to the upstream surface inclination to the outer diameter of the aft end 262. In other embodiments, the outer diameters may be greater or less than the aforementioned ranges. In still other embodiments, the forward and aft ends 260, 262 may have substantially equal outer diameters. In still yet other embodiments, the outer diameter of the forward end 260 may be less than the outer diameter of the aft end 262.

The mounting flange 252 is adapted to provide a static structure to which the outer race 244 of the bearing assembly 238 is coupled, in an embodiment. In accordance with an embodiment, the mounting flange 252 extends inwardly from the cylindrical section 250. The static structure 248 to which the outer race 244 of the bearing assembly 238 is mounted may be coupled to the mounting flange 252, in an embodiment. In another embodiment, the outer race 244 may be directly coupled to the mounting flange 252. The mounting flange 252 may include an angled section and a perpendicular section, in an embodiment. According to an embodiment, the angled section may angle toward the forward end 260 relative to a centerline 266 of the turbine engine 200, and the perpendicular section may extend substantially perpendicular to the centerline 266. In other embodiments, the angled section of the mounting flange 252 may extend toward the aft end 262 of the static aft bearing structure 240. In still other embodiment, the mounting flange 252 may be entirely substantially perpendicular relative to the centerline 266. In any case, the particular configuration of the mounting flange 252 may depend on a positioning of the bearing assembly 238 on the rotor 202.

The mounting flange 252 and an inner surface 253 of the cylindrical section 250 form a cavity 268 within which the bearing assembly 238 is disposed, in an embodiment. The cavity 268 may be surrounded by an exhaust flowpath 270, which is defined between the static aft bearing structure 240 and an outer casing 272. The exhaust flowpath 270 is configured to receive combusted air from the turbine section 208, which may be employed to educt cooling air through a surrounding eductor plenum 280 and an oil cooler 289, in an embodiment. In another embodiment, the air may be directed aft toward an exhaust tailpipe 274 to thereby expel exhaust gas out of the aircraft. As a result, the high temperatures of the combusted air may cause air within the cavity 268 to increase in temperature.

To decrease the cavity 268 temperature, the plurality of hollow struts 254 (only one of which is shown in FIG. 2) may be configured to provide a pathway for cooling air to flow into the cavity 268. In accordance with an embodiment, the hollow struts 254 may be configured to extend from the static aft bearing structure 240 toward the outer casing 272 and through the exhaust flowpath 270. In an embodiment, each hollow strut 254 includes an outer radial end 276, which may extend through an opening in the outer casing 272 to receive air from a cool air source. According to an embodiment, the cool air source may be the eductor plenum 280 that is isolated from the exhaust flowpath 270. For example, the eductor plenum 280 may be in communication with a cooler engine compartment and momentum in the energy of the exhaust gas may entrain the air from the cooler engine component through the oil cooler 289 to exit the engine 200. In other embodiments, the eductor plenum 280 may be in communication directly with external cooler ambient air outside an engine nacelle (not shown).

Figure 3:
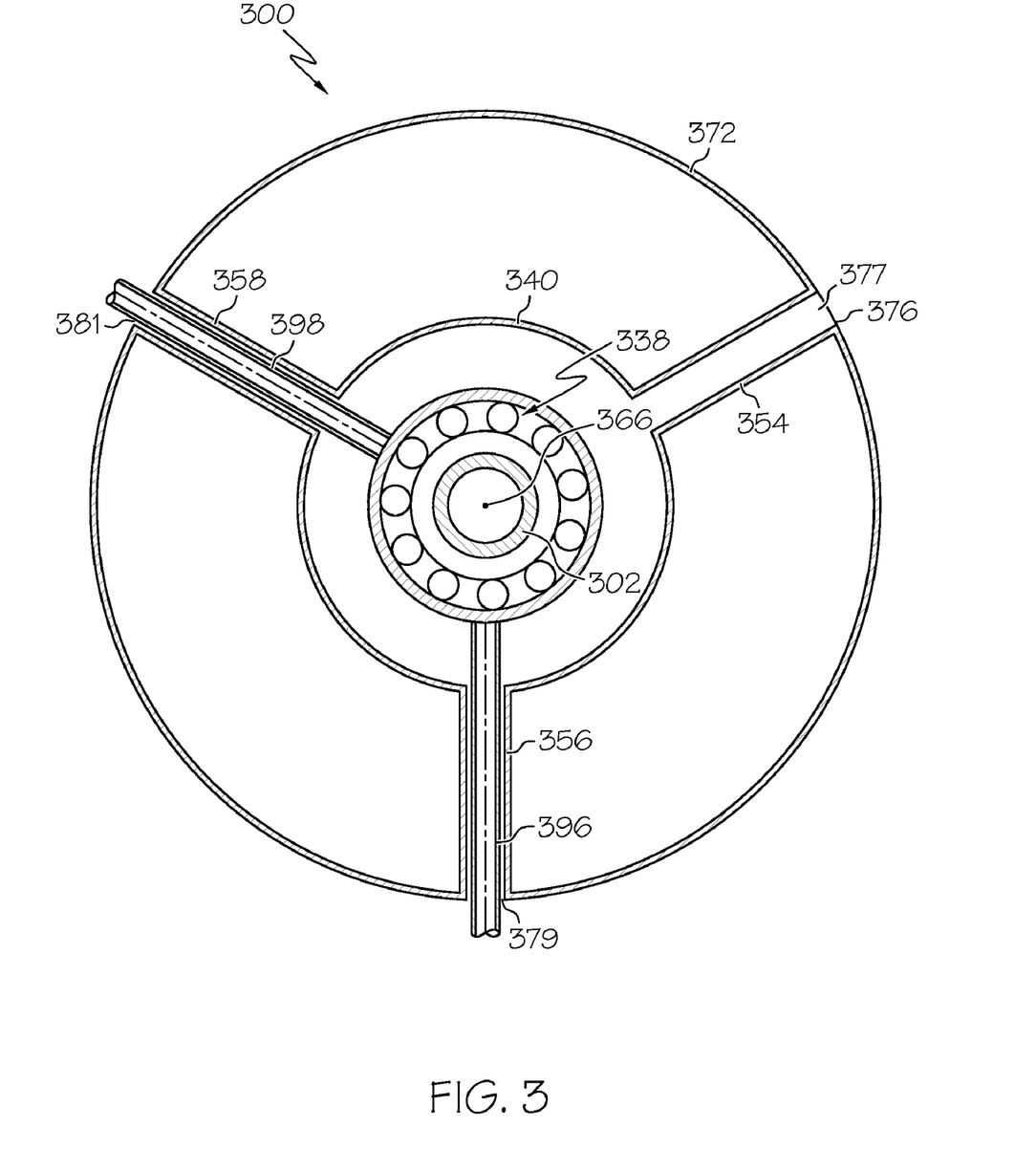
FIG. 3 is a simplified end view of a portion of an exhaust section, according to an embodiment.

FIG. 3 is a simplified end view of a portion of an exhaust section 300 taken along line 3-3, according to an embodiment. The exhaust section 300 includes a static aft bearing structure 340 disposed around a bearing assembly 338 and a rotor 302, and an outer casing 372 surrounding the static aft bearing structure 340. All of the components may be configured in a manner similar to that described above. As shown in FIG. 3, the static aft bearing structure 340 may include three hollow struts 354, 356, 358, in an embodiment. In accordance with an embodiment, the hollow struts 354, 356, 358 may be substantially evenly spaced around a centerline (depicted by dot 366) to improve even distribution of cool air to the bearing assembly 338. According to another embodiment, the hollow struts 354, 356, 358 may be substantially identical in configuration. For example, each hollow strut 354, 356, 358 may have substantially the same dimensions. In an embodiment, each hollow strut 354, 356, 358 may have a length in a range of about 14.5 cm to about 16.5 cm, an inlet cross-sectional flow area of about 25 $cm^2$ to about 30 $cm^2$, and an outlet cross-sectional flow area of about 25 $cm^2$ to about 30 $cm^2$. In other embodiments, the hollow struts 354, 356, 358 may be larger, smaller, longer, or shorter than the aforementioned ranges.

In an embodiment, the exhaust section 300 may be configured such that a first hollow strut 354 is positioned closer to a cool air source than the other hollow struts 356, 358. In an embodiment in which the hollow struts 354, 356, 358 have substantially identical dimensions, in order to equalize distribution of the air flow to the bearing assembly 338, a restrictive flow device 376 may be included on the first hollow strut 354 so that a rate of flow through an inlet 377 of the first hollow strut 354 may be substantially equal to a rate of flow through inlets 379, 381 of the other two hollow struts 356, 358. According to an embodiment, the restrictive flow device 376 may comprise separate device, such as a valve or different sized orifices in the hollow struts. In another embodiment, the restrictive flow device 376 may comprise a feature that is integrally formed on part of the hollow strut 354. For example, an inner surface of the hollow strut 354 may include an annular lip, and the annular lip may have a cross-sectional flow area that is less than an inlet flow area of the other two hollow struts 356, 358. In another example, the hollow struts 354, 356, 358 may not be identical in configuration, and the first hollow strut 354 may have an inlet flow area that is less than an inlet flow area of each of the other two hollow struts 356, 358. In such an embodiment, a restrictive flow device 376 may be omitted. In other examples, one or more of the hollow struts 354, 356, 358 may be longer or shorter than the other hollow struts 354, 356, 358. In still other embodiments, fewer or more than three hollow struts may be employed.

According to an embodiment, whether the hollow struts 354, 356, 358 are identical in configuration may depend on whether other components are extended through the struts 354, 356, 358. In an embodiment, one or more of the struts 356, 358 may include an oil feed tube 398 and/or an oil return tube 396 for supplying oil from an oil source (not shown) to the bearing assembly 338 and removing the oil from the bearing assembly 338. The oil may be employed to lubricate the components of the bearing assembly 338. In either of these embodiments, the inlet airflow areas of the hollow struts 354, 356, 358 for receiving the cool air may depend on a diameter of the tubes 396, 398. For example, inclusion of the oil feed tube 398 and/or an oil return tube 396 may block airflow through a corresponding hollow strut 354, 356, 358. In a case in which the tubes are included in the second and third struts 356, 358, respectively, each of the second and third struts 356, 358 may have available cool air inlet flow areas that are about half of an original cross-sectional area. The inlet flow area of the first hollow strut 354 may be in a range of twice the original cross-sectional area of the other two struts 356, 358, in an embodiment. In other embodiments, the inlet flow areas may be greater or less than the aforementioned ranges. In any case, restrictive flow devices may be included to equalize flow through the hollow struts 354, 356, 358.

Returning to FIG. 2, to encourage the cool air to flow from the cool air source to the cavity 268, a center body cap 282 may be disposed over the aft end 262 of the static aft bearing structure 240. In an embodiment, the center body cap 282 includes a center hub 284, a rim 286, and a conical section 287. In an embodiment, the centerbody cap 282 may be formed from two pieces coupled together, where the center hub 284 is formed as a single piece and the rim 286 and conical section 287 are disposed on a second piece. The pieces may be welded, bolted, or otherwise connected to each other. In other embodiments, the center body cap 282 may formed as a single integral piece. In still other embodiments, the center body cap 282 may be formed from more than two pieces. In any event, the center hub 284 is employed to mount the center body cap 282 to an end 288 of the static structure 248 and may be bolted, screwed or otherwise coupled to the static structure 248, as shown in FIG. 2. In one embodiment, an insulation blanket 290 may be disposed between the center hub 284 and the end 288 of the static structure 248. In other embodiments, the insulation 290 may be omitted.

Figure 4:
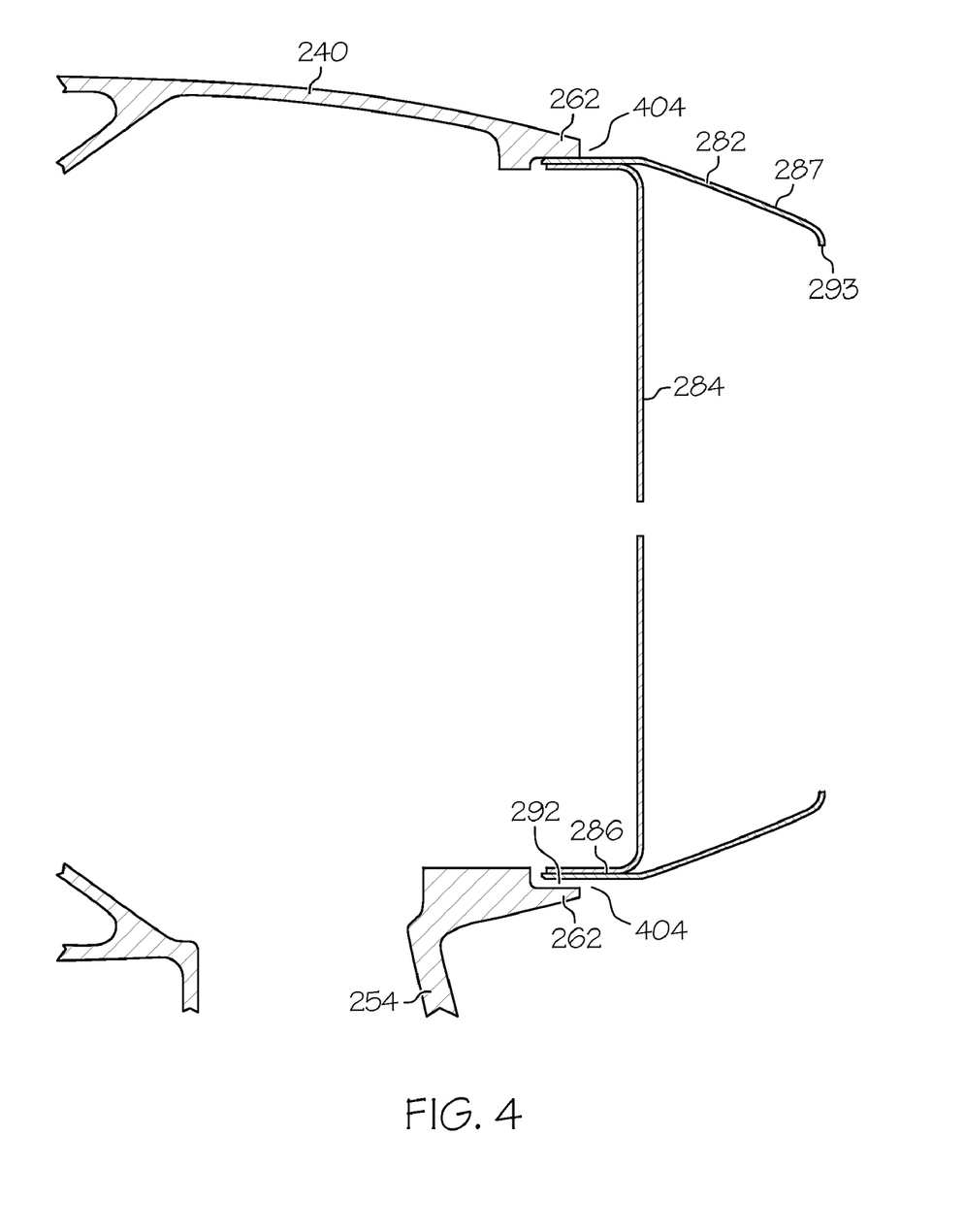
FIG. 4 is a close-up view, isolated view of the static aft bearing structure and center body cap of FIG. 2, according to an embodiment.

The rim 286 is generally interference fit with the static aft bearing structure 240, but when attached to the aft end 262 forms various features which create a low pressure region at an interface between the static aft bearing structure 240 and the center body cap 282. As used herein, the term "low pressure region" may be defined as a region having a pressure that is lower than a pressure within the cavity 268. FIG. 4 is a close-up, isolated view of the static aft bearing structure 240 and the center body cap 282 of FIG. 2, according to an embodiment. In an embodiment, the aft end 262 of the static aft bearing structure 240 is relatively blunt to create an aft facing step 404 over which exhaust gas flows, when flowing from the static aft bearing structure 240 onto the outer diameter of the center body cap 282. The step 404 is used in conjunction with one or more slits 292 formed between the rim 286 and the aft end 262 to draw air through the hollow struts 254. According to an embodiment, the step 404 may have a height in a range of about 0.8 mm to about 1.6 mm, and the slit 292 may have a height in a range of about 0.8 mm to about 1.6 mm. In another embodiment, the height ranges of the step 404 and/or the slit 292 may be greater or less than the aforementioned ranges.

Figure 5:
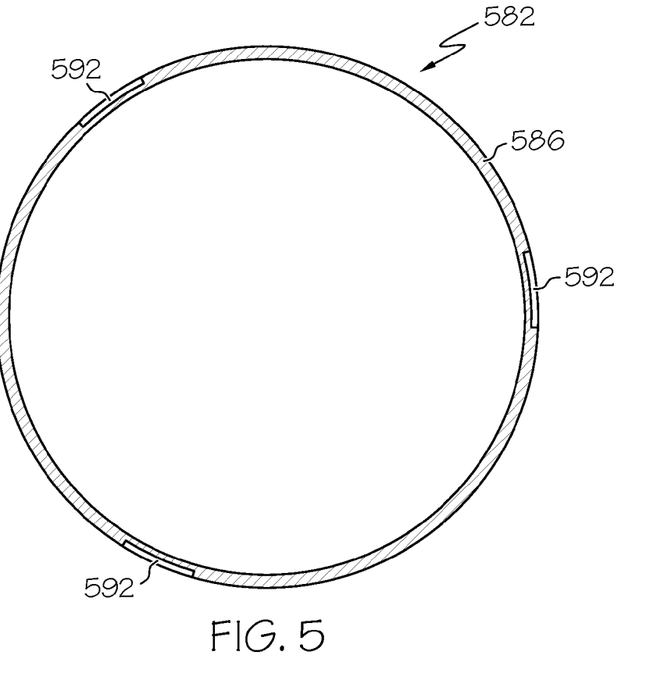
FIG. 5 is an end view of a rim of a center body cap, according to an embodiment.

Various configurations may be employed to form the one or more slits 292. FIG. 5 is an end view of a rim 586 of a center body cap 582, according to an embodiment. In an embodiment, the rim 586 may be ring-shaped, but also may include one or more shallow grooves 592 in the circular shape. In such an embodiment, the rim 586 generally may have an outer diameter that is slightly less than an inner diameter of the aft end 262 (FIGS. 2 and 4) of the static aft bearing structure 240 (FIGS. 2 and 4) to thereby form an interference fit with the aft end 262 of the static aft bearing structure 240, and each groove 592 may form the slit 292 through which air may be drawn. In example, the grooves 592 may have axial lengths in a range of about 0.6 mm to about 10 mm, circumferential lengths in a range of about 12 mm to about 25 mm, and depth measurements within the range provided above for the height of the slit 292 (FIGS. 2 and 4). In other embodiment, the grooves 592 may have measurements that are greater or less than the previously-provided ranges. In an embodiment, all of the grooves 592 may have substantially identical dimensions. Alternatively, the grooves 592 may not be identical. Although three grooves 592 are included in this embodiment, fewer or more may be included in other embodiments.

Figure 6:
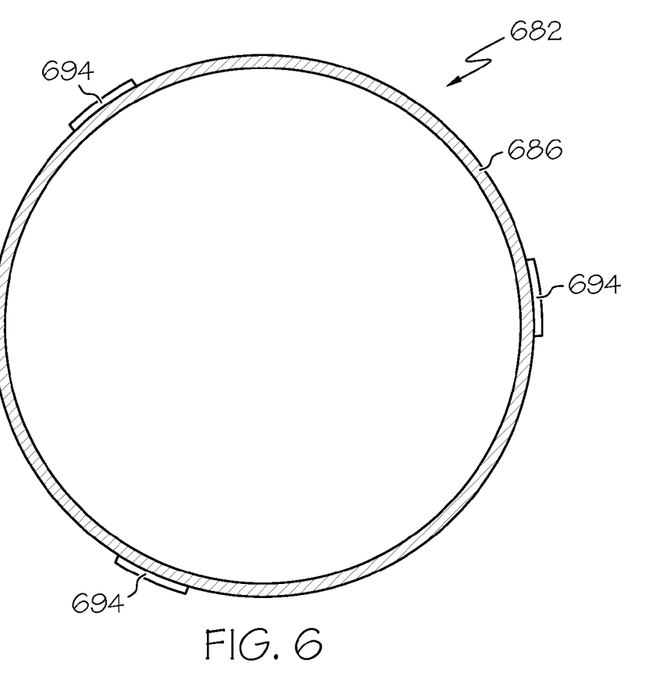
FIG. 6 is an end view of a rim of a center body cap, according to another embodiment.

FIG. 6 is an end view of a rim 686 of a center body cap 682, according to another embodiment. In an embodiment, the rim 686 of the center body cap 682 is ring-shaped, but includes one or more standoffs 694 attached to an outer diameter of the rim 686. According to an embodiment, the rim 686 generally may have an outer diameter that is less than an inner diameter of the aft end 262 (FIGS. 2 and 4) of the static aft bearing structure 240 (FIGS. 2 and 4) and the standoffs 694 may act as shims to allow an interference fit with the aft end 262 of the static aft bearing structure 240. According to an embodiment, the standoffs 694 may have a thickness in a range of about 0.8 mm to about 1.6 mm to form the slit 292 through which air may be drawn. In other embodiments, the standoffs may be thicker or thinner than the aforementioned range to form a wider or narrower slit 292. In an embodiment, all of the standoffs 694 may have substantially identical dimensions. Alternatively, the standoffs 694 may not be identical. Although three standoffs 694 are included in this embodiment, fewer or more may be included in other embodiments. The standoffs 694 may be welded, bolted or otherwise coupled to the rim 686, in an embodiment. In other embodiments, the standoffs 694 may be disposed between the rim 686 and the static aft bearing structure 240, and may even be coupled to the static aft bearing structure 240 rather than to the rim 686.

In another embodiment, the standoffs 694 and/or slits 292 may also be included in the inner surface of the aft end 262, which contacts and is coupled to a smooth end of the center body cap 682.

With reference back to FIGS. 2 and 4, the conical section 287 extends axially from the rim 286 past the center hub 284. In an embodiment, the conical section 287 forms a relatively sharp corner at its interface with the rim 286. In another embodiment, the interface between the conical section 287 and the rim 286 is smooth. According to an embodiment, the conical section 287 is angled as a continuation of a slope from an outer surface of the static aft bearing structure 240. An aft end 293 of the conical section 287, may curve radially inwardly toward the centerline 266, in an embodiment. In other embodiments, the aft end 293 may not curve. The conical section 287 may have an axial length in a range of about 5 cm to about 18 cm, a largest outer diameter in a range of about 5 cm to about 8 cm, and a smallest outer diameter in a range of about 2.5 cm to about 5 cm, in an embodiment. In other embodiments, the dimensions of the conical section 287 may be larger or smaller than the aforementioned ranges.

During engine operation, combustion gases flow through the exhaust flowpath 270. Because a low pressure region is formed at the interface between the static aft bearing structure 240 and the centerbody cap 282, cool air is drawn from a cool air source, such as from outside the engine casing or from the plenum 280 (FIG. 2) through the hollow shafts 254 and into the cavity 268 around the bearing assembly 238. The cool air reduces an internal temperature of the cavity 268 to thereby maintain the bearing assembly 238 and/or oil around the bearing assembly 238 within acceptable temperature ranges to thereby minimize coking. By creating the low pressure region, air may be continuously and passively drawn through the hollow shafts 254 without the expenditure of energy that may not be available for cooling use.

The cooling system described above provides improved protection from high temperatures over conventional heat shield mechanisms. In addition, the cooling system is relatively simple and inexpensive to implement. Moreover, the cooling system to be suitable for retrofit into existing engines. For instance, existing static aft bearing structures and center body caps may easily be replaced with static aft bearing structures and center body caps having configurations as described above.

While at least one exemplary embodiment has been presented in the foregoing detailed description of the inventive subject matter, it should be appreciated that a vast number of variations exist. It should also be appreciated that the exemplary embodiment or exemplary embodiments are only examples, and are not intended to limit the scope, applicability, or configuration of the inventive subject matter in any way. Rather, the foregoing detailed description will provide those skilled in the art with a convenient road map for implementing an exemplary embodiment of the inventive subject matter. It being understood that various changes may be made in the function and arrangement of elements described in an exemplary embodiment without departing from the scope of the inventive subject matter as set forth in the appended claims.

What is claimed is:

1. A cooling system, comprising:
a rotor;
a bearing assembly mounted to the rotor;
a static aft bearing structure surrounding the bearing assembly and including a cylindrical section defining a cavity within which the bearing assembly is disposed;
an outer casing surrounding the static aft bearing structure and defining a portion of an exhaust pathway;
a plurality of hollow struts extending from the static aft bearing structure towards the outer casing and through the exhaust pathway, each hollow strut including an outer radial end configured to receive a gas from an air source and to provide a pathway for the gas to flow into the cavity; and
a center-body cap disposed over an end of the static aft bearing structure, the center-body cap including a rim configured to create a low pressure region at an interface between the static aft bearing structure and the center-body cap, wherein the low pressure region has a pressure that is lower than a pressure within the cavity.

2. The cooling system of claim 1, wherein the air source comprises air from an eductor plenum.

3. The cooling system of claim 1, further comprising an engine casing surrounding the cooling system, wherein the air source comprises air from outside of the engine casing.

4. The cooling system of claim 1, wherein:
the static aft bearing structure including a mounting flange extending inwardly from the cylindrical section; and
the bearing assembly includes an outer race coupled to the mounting flange.

5. The cooling system of claim 1, wherein:
the cylindrical section has an aft end;
the aft end is relatively blunt and creates a step, when the rim is disposed within the aft end; and
a slit is included between the aft end and the rim.

6. The cooling system of claim 5, wherein:
the rim is ring-shaped;
the rim includes a groove; and
the groove forms the slit.

7. The cooling system of claim 5, wherein:
the rim is ring-shaped;
a standoff is disposed between the rim and the static aft bearing structure to form the slit.

8. The cooling system of claim 1, wherein the center-body cap includes further comprises a center hub coupled to an end of the static aft bearing structure.

9. The cooling system of claim 1, wherein the center-body cap includes further comprises a conical section extending from the rim.

10. The cooling system of claim 1, wherein:
the plurality of hollow struts includes a first hollow strut and a second hollow strut, and
an inlet flow area of the first hollow strut is less than an inlet flow area of the second hollow strut.

11. The cooling system of claim 1, wherein:
the plurality of hollow struts includes a first hollow strut; and
a restrictive flow device is included on the first hollow strut.

12. The cooling system of claim 1, further comprising an oil tube extending through a hollow strut of the plurality of hollow struts.

13. An assembly for cooling an aft bearing assembly mounted to a rotor, the assembly comprising:
a static aft bearing structure configured to surround the aft bearing assembly and including a cylindrical section defining a cavity for disposal of the aft bearing assembly;
a plurality of hollow struts extending from the static aft bearing structure, each hollow strut including an outer radial end configured to receive a gas from an air source and to provide a pathway for the gas to flow into the cavity; and
a center-body cap disposed over an end of the static aft bearing structure, the center-body cap including a rim configured to create a low pressure region at an interface between the static aft bearing structure and the center-body cap, wherein the low pressure region has a pressure that is lower than a pressure within the cavity.

14. The assembly of claim 13, wherein:
the static aft bearing structure including a mounting flange extending inwardly from the cylindrical section, the mounting flange configured to couple to an outer race of the aft bearing assembly.

15. The assembly of claim 13, wherein:
the cylindrical section has an aft end;
the aft end is relatively blunt and creates a step, when the rim is disposed within the aft end; and
a slit is included between the aft end and the rim.

16. The assembly of claim 15, wherein:
the rim is ring-shaped;
the rim includes a groove; and
the groove forms the slit.

17. The assembly of claim 15, wherein:
the rim is ring-shaped;
a standoff is disposed between the rim and the static aft bearing structure to form the slit.

18. The assembly of claim 15, wherein:
the plurality of hollow struts includes a first hollow strut; and
a restrictive flow device is included on the first hollow strut.

19. The assembly of claim 15, further comprising an oil tube extending through a hollow strut of the plurality of hollow struts.

\* \* \* \* \*